United States Patent [19]

Hein et al.

[11] 4,309,146
[45] Jan. 5, 1982

[54] AMPLIFIED WIND TURBINE APPARATUS

[75] Inventors: Leopold A. Hein, Fayetteville, Tenn.; William N. Myers, Huntsville, Ala.

[73] Assignee: The United States of America as represented by the Administrator of the National Aeronautics and Space Administration, Washington, D.C.

[21] Appl. No.: 129,780

[22] Filed: Mar. 12, 1980

[51] Int. Cl.³ .............................................. F03D 1/04
[52] U.S. Cl. .............................. 415/2 R; 415/DIG. 8
[58] Field of Search ......... 415/2 A, 3 A, 4 A, 2-4 R, 415/DIG. 8

[56] References Cited

U.S. PATENT DOCUMENTS

| 129,567 | 7/1872 | Jones | 415/4 A |
|---|---|---|---|
| 145,214 | 12/1873 | Kline | 415/4 A |
| 1,519,447 | 12/1924 | Fortier-Beaulieu | 415/DIG. 8 |
| 1,545,633 | 7/1925 | Bender | 415/4 A X |
| 3,302,552 | 2/1967 | Walsh | 415/2 A X |
| 3,345,931 | 10/1967 | Walsh | 415/4 A X |
| 4,017,205 | 4/1977 | Bolie | 415/2 A |
| 4,018,543 | 4/1977 | Carson et al. | 415/DIG. 8 |
| 4,070,131 | 1/1978 | Yen | 415/DIG. 8 |
| 4,154,556 | 5/1979 | Webster | 415/2 A |
| 4,236,866 | 12/1980 | Martinez | 415/2 R |

FOREIGN PATENT DOCUMENTS

| 463711 | 8/1928 | Fed. Rep. of Germany | 415/4 A |
|---|---|---|---|
| 2402647 | 7/1975 | Fed. Rep. of Germany | 415/2 A |
| 539099 | 6/1922 | France | 415/3 A |
| 28797 | 3/1925 | France | 415/DIG. 8 |
| 30331 | 5/1926 | France | 415/3 A |
| 843482 | 7/1939 | France | 416/123 |
| 1062631 | 4/1954 | France | 415/4 A |
| 1086320 | 2/1955 | France | 415/2 A |
| 1231581 | 5/1971 | United Kingdom | 415/2 A |
| 1519774 | 8/1978 | United Kingdom | 415/2 A |

OTHER PUBLICATIONS

Aviation Week & Space Technology Mar. 1, 1976; vol. 104; No. 9; pp. 50-51.

Primary Examiner—Everette A. Powell, Jr.
Attorney, Agent, or Firm—Joseph H. Beumer; John R. Manning; L. D. Wofford, Jr.

[57] ABSTRACT

The invention relates to the utilization of wind energy and increasing the effects thereof for power generation. Amplified wind turbine apparatus is disclosed wherein ambient inlet air is prerotated in a first air rotation chamber (B) having a high pressure profile increasing the turbulence and Reynolds number thereof and a second rotation chamber (C) adjacent and downstream of the turbine has a low pressure core profile whereby flow across the turbine is accelerated and thereafter exits the turbine apparatus through a draft anti-interference device (D) which eliminates interference with ambient winds at the outlet of the turbine apparatus. Pivotable vanes 12 controlled in response to prevailing wind direction admit air to the chambers and aid in imparting rotation. A central core 20 may be utilized for creating the desired pressure profile in chamber B.

4 Claims, 8 Drawing Figures

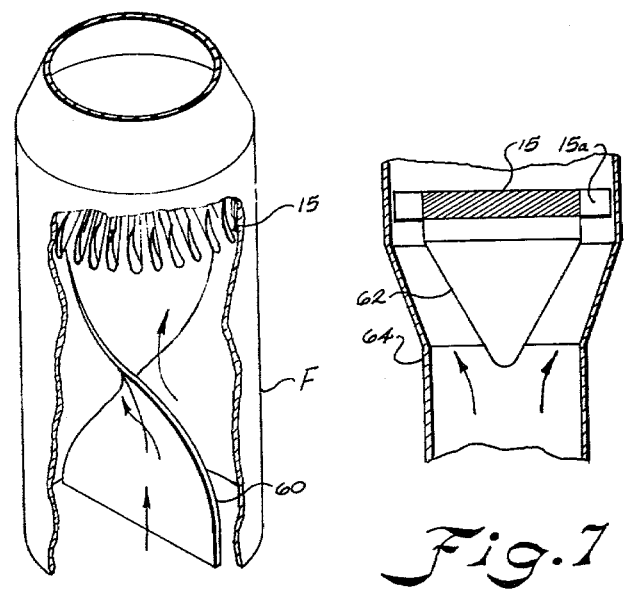
Fig. 7
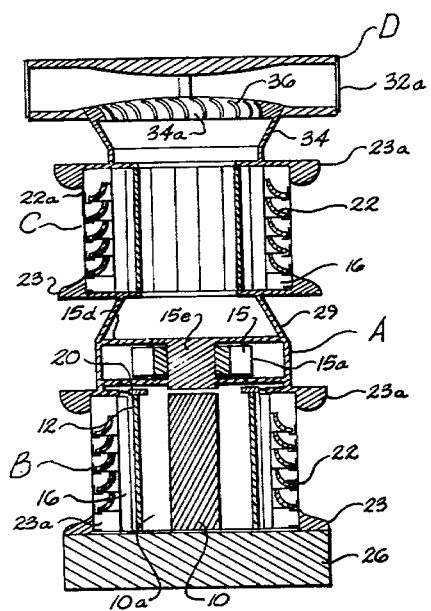
Fig. 6
Fig. 8

4,309,146

AMPLIFIED WIND TURBINE APPARATUS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

With considerable attention being given alternate forms of energy, the efficient use of wind power and the capturing of increased energy from the winds has recieved much consideration. However, it has generally been known that the chances of obtaining increased energy from the winds is very slim. Due to the normally low Reynolds numbers of the prevailing ambient wind flows, it is difficult to extract more than 55% of the energy from the winds.

One attempt to harness increased wind energy power is disclosed in U.S. Pat. No. 4,070,131 wherein atmospheric wind is admitted tangentially into a vertical structure downstream of the wind turbine which produces a vortex flow and corresponding low pressure core tending to induce air flow across the horizontal turbine.

U.S. Pat. No. 4,031,405 discloses a horizontal turbine having a shroud which adjusts to the direction of wind to enhance the wind affects against the turbine.

Other attempts have been proposed for directing the wind and increasing its effects against a turbine blade including the provision of a turbine having variable pitch blades whereby the angle of attack is varied to compensate for the changes in wind directions.

SUMMARY OF THE INVENTION

It has been found that wind powered turbine apparatus having amplified wind effects can be had by providing a first rotation chamber wherein ambient inlet winds are pre-rotated around a core to increase the Reynolds number prior to impinging the turbine blades and a second air rotation chamber on the downstream side of the turbine in which ambient winds are introduced and rotated to create a low pressure profile whereby flow across the horizontal turbine apparatus includes an antiinterference device for reducing the draft retarding affects of the ambient wind at the turbine outlet.

Accordingly, an important object of the present invention is to provide a wind turbine apparatus which can extract more of the available energy from a given amount of ambient wind flow.

Another important object of the present invention is to amplify the affects of ambient winds through a suitable inlet prior to entering the turbine whereby the turbine apparatus may be used more efficiently at lower wind velocities affording longer running periods.

Still another important object of the present invention is to provide wind turbine apparatus which compensates for changes in the direction of the ambient winds entering the apparatus.

Still another important object of the present invention is the provision of wind turbine apparatus in which interference between the turbine outlet flow and the ambient wind is reduced minimizing outlet losses.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 6 is a perspective view with parts cut away of an alternate embodiment of an air pre-rotational chamber constructed according to the invention wherein the ambient winds are admitted to the device along a vertical axis; and FIG. 7 is an alternate embodiment of an air prerotational chamber according to the invention wherein the core of the device is cone-shaped; and FIG. 8 is a section view taken along line 8—8 of FIG. 1.

DESCRIPTION OF A PREFERRED EMBODIMENT

Figure 1:
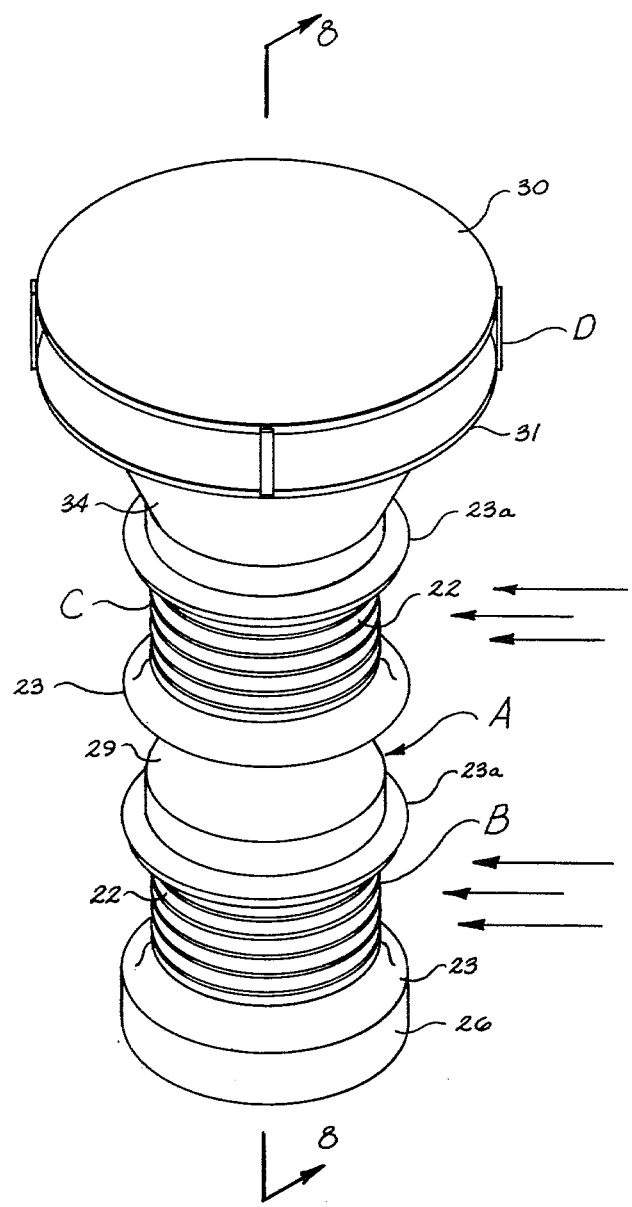
FIG. 1 is a perspective view illustrating wind turbine apparatus constructed according to the present invention.

Apparatus for extracting increased energy from ambient winds is disclosed in FIG. 1 as including a housing A and a horizontal wind turbine carried in the housing having a plurality of turbine blades. An air prerotation chamber B is disposed adjacent the turbine having an air inlet through which ambient wind is admitted for conveyance to the turbine. In the prerotation chamber B inlet air is rotated prior to reaching the turbine means to create a high pressure profile by which larger wind forces are applied at the tips of the turbine. Downstream, next adjacent the turbine is a second air rotation chamber C having an air inlet for admitting ambient wind to create a low pressure on the downstream side of the turbine facilitating air flow across the turbine in an accelerated manner. Anti-interference means D is provided to reduce interference between the turbine outlet flow and the ambient winds at the outlet of the turbine apparatus minimizing outlet losses.

Figure 2:
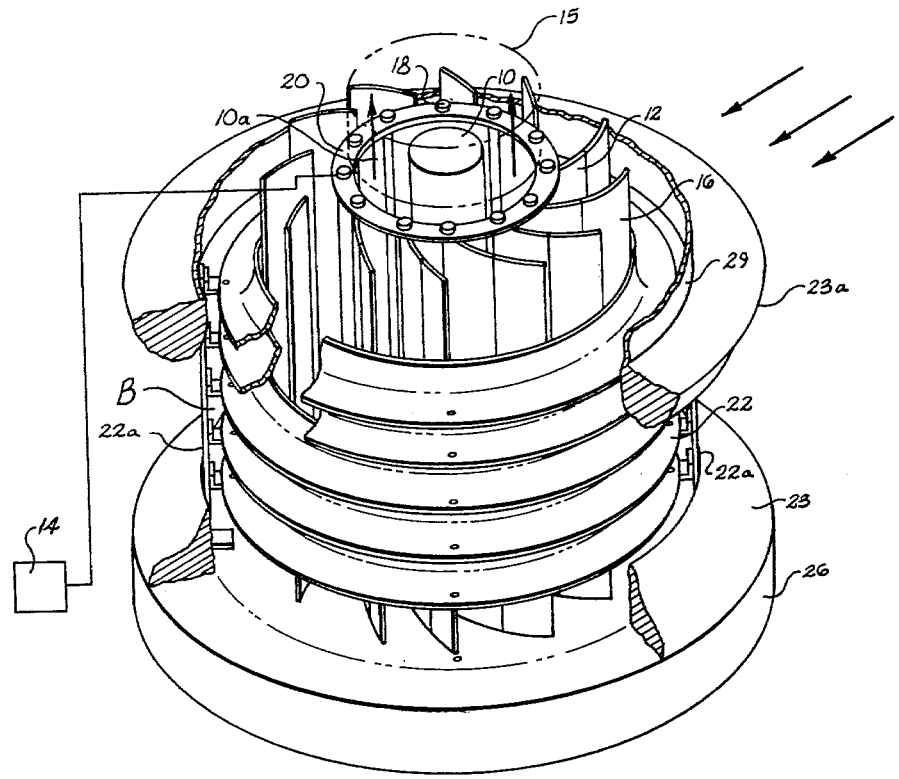
FIG. 2 is a perspective view with parts cut away illustrating an air rotation chamber constructed according to the present invention.

Referring now in more detail in the drawings, FIG. 2 illustrates air pre-rotation chamber B as including a central profiled core 10 about which the incoming air rotates. Circumferentially spaced about core 10 is a plurality of curved pivotal vertical vanes 12 which may be selectively opened and closed depending on the direction of the ambient winds by means of any conventional servo mechanism and sensor apparatus 14. An air pipe 10a is defined between the core 10 and vanes 12 through which the prerotated air passes to a horizontal turbine 15 having turbine blades 15a. Adjacent pivotable vanes 12 are a plurality of corresponding stationary vanes 16 which form a continuation of the opened pivotal vanes 12a to provide curved entrance passage through which the incoming air enters the air pipe 10a and is rotated. The pivotable vanes 12 may be carried by pivots 18 about a ring frame 20 adjacent the upper and lower ends thereof and suitably affixed in housing A. Upwardly curved stationary vanes 22 are provided concentric about the stationary vertical vanes 16 to direct the incoming air upwardly through the passages 13 and the air pipe 10a to the turbine blade tips. An aerodynamic air inlet is provided by conical annular members 23 and 23a which introduce air to the inlet passages of vanes 22 and 16. Vanes 22 may also be carried between member 23a and base 26 in any suitable manner, such as vertical struts 22a.

It will be noted that core 10 is fixed and extends from adjacent the turbine to the bottom of the pre-rotation chamber B and is stationary relative to turbine 15. As air enters pre-rotation chamber B a high pressure profile is created across the chamber such that a low pressure exists around core 10 and a high pressure exists at the outside of the air pipe as defined by vanes 12. The largest wind forces will be applied to the blade tips 15a of the turbine where the moment arm is the greatest. Turbulence, and hence Reynolds number, of the incoming air is increased prior to reaching the turbine.

Air rotation chamber C may be identical to that of chamber B except that core 10 is preferably omitted and the like numerals have been used. Ambient winds enter the air rotation chamber and create a low pressure core profile therein whereby flow across the turbine 15 is accelerated from chamber B to C. A convergent housing section 29 connects chambers B and C wherein air flow is further accelerated. Turbine 15 may be carried by any suitable manner such as narrow struts 15d extending across the housing A and affixed to the sides thereof which carry a hub 15e about which the turbine rotates. Power take-off from the rotating turbine may be had in any conventional manner such as self-contained electrical generating units with rotor parts carried by the turbine and stator parts carried by hub 15e.

Figure 4:
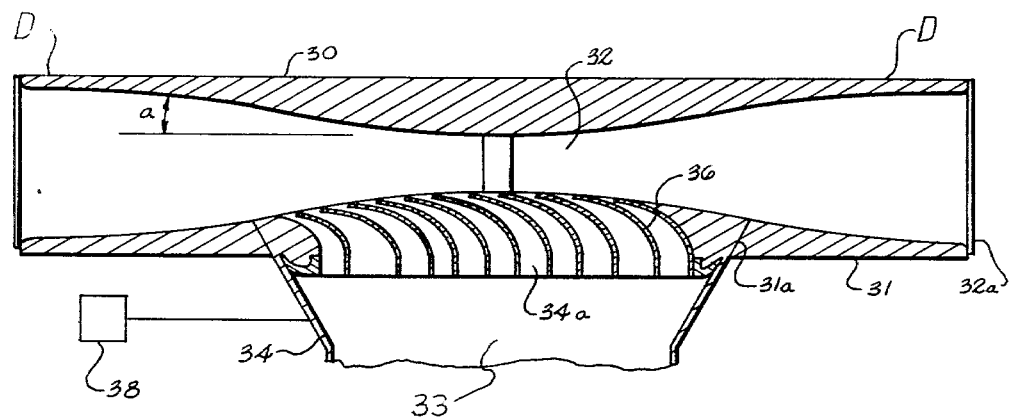
FIG. 4 is a sectional view illustrating the outlet interference reduction device constructed according to the invention.

As illustrated in FIG. 4, anti-draft interference device D includes a pair of circular disk-shaped elements 30 and 31 which are open all the way around and are convexly curved inwardly to define a venturi-like device having a throat 32 in the middle thereof open omni-directionally to the ambient wind. The disk elements may be spaced and supported by any suitable means such as struts 32a extending therebetween. The ambient winds can enter the device D from any direction whereby a low pressure region is created to provide a pump effect enhancing the draft of air outwardly from the turbine outlet 33 through opening 31a formed in the lower element 31. Interference is effectively avoided between the air leaving the turbine and the ambient winds going across it.

Underneath disk element 30, received in the opening 31a formed in the lower disk 31 is a divergent section 34 which includes a top portion having a plurality of curved vanes 36 which plug opening 31a and provide an outlet 34a for the flow of exhaust air. Section 34 may be caused to rotate within opening 31a about annular member 23a in response to the ambient wind direction by use of a conventional servo-mechanism and control 38 as is well known. Vanes 36 are curved upwardly and outwardly so that flow outwardly therethrough is directed favorably with the ambient winds flowing through device D when 34 is rotated. The vanes 36 may have a curved spoon-shape and side section essentially as shown. It has been found that a diffusion angle, a, of approximately twelve (12) degrees effectively promotes boundary layer separation which allows the turbine outlet gases to escape with greatly minimized interference at effective wind speed operation.

Figure 3:
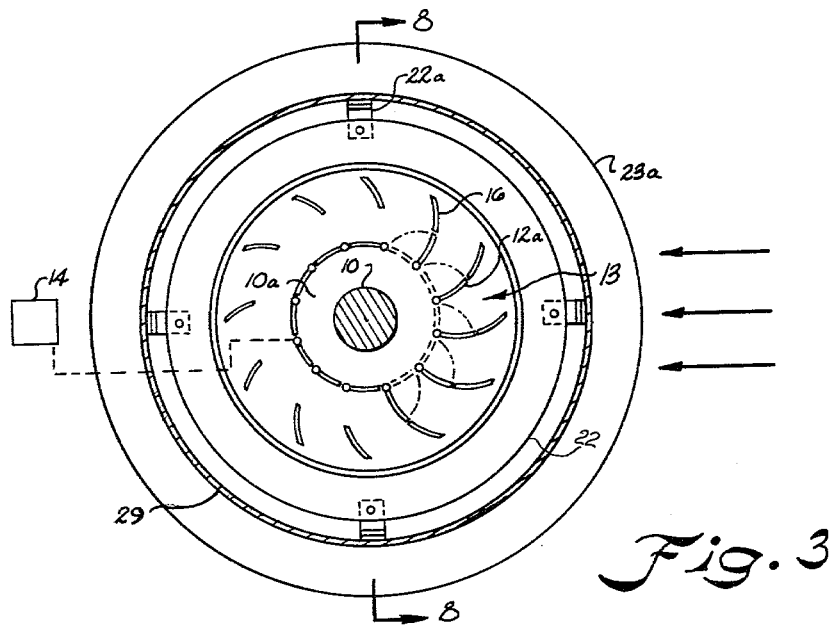
FIG. 3 is a top plan view of the air rotation chamber illustrated in FIG. 2.
Figure 5:
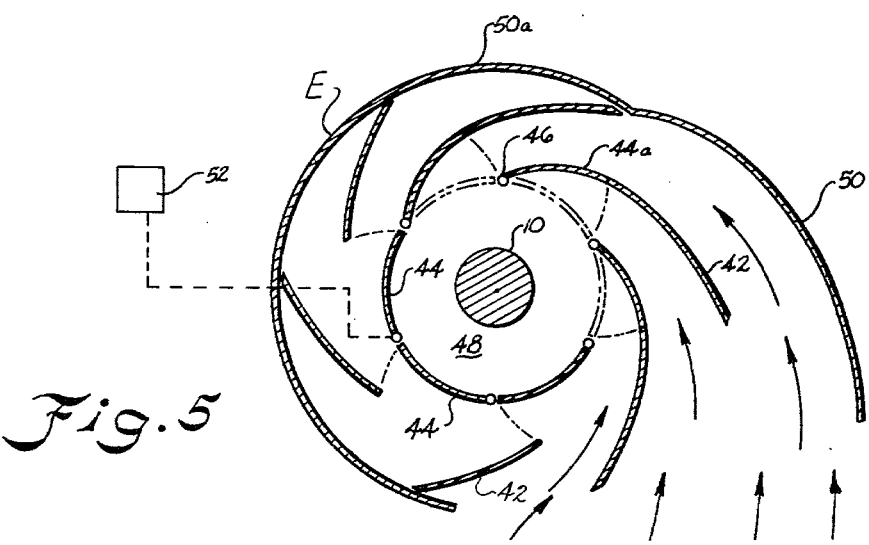
FIG. 5 is a top plan view of an air rotation device according to an alternate embodiment of the present invention.

FIG. 5 illustrates another embodiment E of an air rotation chamber, such as B and C, with or without core 10 in which vanes 42, which correspond to 16 in FIG. 3, are extended in length and are made more definitely curved. Vanes 42 are stationary and are continued by movable vanes or flaps 44 which pivot about 46 (carried by suitable ring frames as shown in FIG. 2). Vanes 44 define an air flow pipe 48 which is closed at its back side against the winds and open on its front side for the admission of air through opened curved vanes 44a which rotate the incoming air to create the vortex flows therein. A movable air scoop 50 may rotate as part of housing 50a and introduces a large volume of air to the air rotation chamber. Upward direction of air is optional and may be done with upwardly curved vanes such as shown in FIG. 2. Vanes 44 may be pivoted responsive to the direction of wind flow by means of a conventional servo-mechanism and control 52.

FIG. 6 illustrates a form of the invention wherein the inlet air is admitted to the turbine via an air rotation chamber F instead of as shown in FIG. 1. In this instance, an adjustable turn sail 60 having a generally cork-screw shape is provided which rotates the air prior to reaching the turbine. The air may enter chamber F tangentially or axially. If tangentially, a cone-shape core 62 and housing 64 may be utilized to create the desired high pressure profile as illustrated in FIG. 7.

It is to be understood that while air inlets 50 and the various turbine inlet and outlet vanes have been indicated separately to rotate with the prevailing wind, the same may be controlled together.

Thus, it can be seen that wind turbine apparatus can be had according to the present invention wherein the winds effects are amplified to extract more energy from the ambient winds wherein rotation chambers are provided in order to increase the turbulence and acceleration of air across the turbine while post turbine wind interference between the ambient wind and flow of outlet gases is minimized to further enhance turbine performance. It has been estimated that power output increase of twenty percent may be achieved as compared to free stream turbine runners.

While a preferred embodiment of the invention has been described using specific terms, such description is for illustrative purposes only, and it is to be understood that changes and variations may be made without departing from the spirit or scope of the following claims.

What is claimed is:

1. Wind powered turbine apparatus having amplified wind effects comprising:
  a housing;
  a wind turbine rotatably carried in said housing having a plurality of turbine blades;
  a first air inlet carried by said housing through which a first ambient air flow is admitted for conveyance to said wind turbine;
  an air pre-rotation chamber carried by said housing and disposed in series air flow between said air flow inlet and said wind turbine;
  a plurality of pivotable curved vertical vane elements carried about pivots circumferentially spaced about said air pre-rotation chamber, said vanes being selectively opened and closed to define an air pipe within said chamber through which said air flows, said vane elements being opened on a side fronting the prevaling ambient winds and closed on an opposing back side thereof forming a curved wall of said air pipe, said open vertical vanes imparting a rotational motion to said air flow prior to reaching said turbine;

a plurality of upwardly curved horizontal vane elements carried adjacent said vertical vane elements of said air pre-rotation chamber imparting an upward motion to said air flow; said horizontal vanes being spaced vertically along the height of said vertical vanes;

a core element centrally disposed in said air chamber immediately below said wind turbine extending generally the height of said vertical vanes defining a space between said core element and said air pipe wall within said air pre-rotation chamber, said air vanes rotating said air around and about said core imparting centrifugal force to said air flow creating a low pressure profile adjacent said core and a high pressure profile adjacent said wall of said air pre-rotation chamber;

said turbine blade having tips being disposed generally above said space defined in said air pre-rotation chamber, the wind forces of said high pressure profile being applied to said tips of said turbine blades at the outlet of said air pipe for more efficient utilization of said wind;

a second air rotation chamber carried by said housing adjacent the opposite side of said wind turbine;

a second air inlet carried by said housing for admitting a second ambient air flow to said second air rotation chamber;

said second air rotation chamber including a second plurality of pivotable vertical vane members having pivots circumferentially spaced around said second air rotation chamber and being selectively opened for imparting rotation to said second air flow creating a low pressure profile in said second air rotation chamber accelerating air flow across said wind turbine; and draft anti-interference means carried by said housing downstream of said air rotation chamber adjacent an outlet of said wind turbine for releasing interference between air leaving the turbine and outside ambient wind flow across said outlet.

2. The apparatus of claim 1 wherein each said air rotation chamber includes a plurality of fixed curved vane members circumferentially spaced about said pivotal vane members and forming a continuation of said pivotal vane members when said pivotal vane members are pivoted to said open position.

3. The apparatus of claim 1 wherein said draft anti-interference means includes a fixed omni-directional air inlet having upper and lower vertically spaced disk-shaped elements carried adjacent said turbine outlet having opposed curved portions forming a restricted throat portion therebetween open omni-directionally to the flow of ambient winds therethrough, said lower element having an opening formed therein through which air flows outwardly from said turbine apparatus.

4. The apparatus of claim 3 including a plurality of vane members carried in said lower disk opening being curved upwardly and outwardly for directing said outlet flow in the direction of ambient wind through said anti-interference means.

* * * * *